US012507200B2

(12) United States Patent
Tang et al.

(10) Patent No.: US 12,507,200 B2
(45) Date of Patent: Dec. 23, 2025

(54) SCHEMES ON GNSS POSITION FIX IN CONNECTED IN IoT NTN

(71) Applicant: MediaTek Singapore Pte. Ltd., Singapore (SG)

(72) Inventors: Wen Tang, Beijing (CN); Gilles Charbit, Beijing (CN); Yao-Hua Cai, Shanghai (CN); Xu Huang, Shanghai (CN); Xuan Wang, Shanghai (CN); Ye Huang, Shanghai (CN); Xuancheng Zhu, Shanghai (CN)

(73) Assignee: MediaTek Singapore Pte. Ltd, Singapore (SG)

( * ) Notice: Subject to any disclaimer, the term of this patent is extended or adjusted under 35 U.S.C. 154(b) by 323 days.

(21) Appl. No.: 18/448,084

(22) Filed: Aug. 10, 2023

(65) Prior Publication Data

US 2024/0007992 A1    Jan. 4, 2024

Related U.S. Application Data

(63) Continuation of application No. PCT/CN2022/102971, filed on Jun. 30, 2022.

(30) Foreign Application Priority Data

Jun. 30, 2022  (WO) ................ PCT/CN2022/102971
Jun. 2, 2023   (CN) .......................... 202310652292.6

(51) Int. Cl.
   *H04W 64/00*   (2009.01)
   *H04W 74/00*   (2009.01)

(52) U.S. Cl.
   CPC ....... *H04W 64/003* (2013.01); *H04W 74/006* (2013.01)

(58) Field of Classification Search
   CPC ..... H04W 64/003; H04W 74/006; G01S 5/01; G01S 19/396; H04B 7/18513
   See application file for complete search history.

(56) References Cited

U.S. PATENT DOCUMENTS

| 2023/0035711 | A1* | 2/2023 | Zheng ..................... G01S 5/011 |
| 2024/0121060 | A1* | 4/2024 | Prasad .................. H04L 5/0051 |
| 2025/0071724 | A1* | 2/2025 | Huang .................. H04W 4/029 |

OTHER PUBLICATIONS

Rahman, Imadur, et al. "5G evolution toward 5G advanced: An overview of 3GPP releases 17 and 18." Ericsson Technology Review 2021.14 (2021): 2-12. (Year: 2021).*

(Continued)

*Primary Examiner* — Sharad Rampuria
(74) *Attorney, Agent, or Firm* — Helen Mao; Imperium Patent Works (57) ABSTRACT

Apparatus and methods are provided for GNSS position fix in connected state. In one novel aspect, the UE reports GNSS assistance information to the network entity in the NTN system, wherein the GNSS assistance information includes a GNSS position fix time duration for measurement. When the UE detects the GNSS position out-of-date condition in the RRC_CONNECTED stated, the UE determines whether the GNSS position fix time duration for measurement is smaller than the network scheduled duration for GNSS measurement and performs the GNSS position acquisition procedure in the RRC_CONNECTED state if determined yes. In another embodiment, the network scheduled duration for GNSS measurement is configured for the UE to re-acquire GNSS position fix in the RRC_CONNECTED state and may further include duration to re-acquire downlink (DL) synchronization with or without NTN system information block (SIB). In one embodiment, the network scheduled duration for GNSS measurement is a new scheduling gap or a GNSS timer.

23 Claims, 7 Drawing Sheets

(56) References Cited

OTHER PUBLICATIONS

European Intellectual Property Office Action 23182056.4-1206., dated Nov. 9, 2023 (9 pages).

* cited by examiner

SCHEMES ON GNSS POSITION FIX IN CONNECTED IN IoT NTN

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2022/102971, titled "Schemes on GNSS position fix in connected in IoT NTN," with an international filing date of Jun. 30, 2022, and China application No. 202310652292.6, titled "Schemes on GNSS position fix in connected in IoT NTN," with a filing date of Jun. 2, 2023. The disclosure of each of the foregoing documents is incorporated herein by reference.

TECHNICAL FIELD

The disclosed embodiments relate generally to wireless communication, and, more particularly, to global navigation satellite system (GNSS) position fix in connected in non-terrestrial network (NTN).

BACKGROUND

The NTN system for data transmission, such as the internet of things (IoT) NTN network is a key development for the latest wireless network. In scenarios with large transmission delay, such as the IoT NTN, in order to ensure normal system operation, the UE in the NTN system needs a valid GNSS position fix, which is used to determine the UE's location. For short sporadic data transmissions, the UE acquires the GNSS position fix in the UE IDLE state. For large data transmissions in long connection time, IoT NTN UE may need to re-acquire a valid GNSS position fix. The schemes for UE to re-acquire GNSS position fix in the UE RRC_CONNECTED state is needed.

Improvements and enhancements are required for the UE to re-acquire GNSS position fix in connected state.

SUMMARY

Apparatus and methods are provided for GNSS position fix in connected state. In one novel aspect, the UE reports GNSS assistance information to the network entity in the wireless system, wherein the GNSS assistance information includes the GNSS position fix time duration for measurement. When GNSS position fix trigged in the RRC_CONNECTED stated, the UE determines whether the GNSS position fix time duration for measurement is smaller than a network scheduled duration for GNSS measurement, and performs the GNSS position fix acquisition procedure in the RRC_CONNECTED state if determined yes; otherwise, the UE leaves the RRC_CONNECTED and performs the GNSS position fix acquisition procedure in RRC_IDLE. In one embodiment, the GNSS position fix acquisition procedure is triggered by a GNSS position out-of-date condition in the RRC_CONNECTED state. In another embodiment, the GNSS position fix acquisition procedure is triggered in the RRC_CONNECTED state before the GNSS position fix validity runs out. In one embodiment, the network scheduled duration for GNSS measurement is indicated by one or more higher layer parameters. In another embodiment, the network scheduled duration for GNSS measurement is configured for the UE to re-acquire GNSS position fix in the RRC_CONNECTED state and is based on the UE reported GNSS position fix time duration for measurement, in other words, GNSS position fix measurement length. In yet another embodiment, the network scheduled duration for GNSS measurement is configured for the UE to further re-acquire downlink (DL) synchronization with or without system information block (SIB). In one embodiment, the network scheduled duration for GNSS measurement is cell-specific indicated by an RRC signaling or SIB, or UE-specific indicated by an RRC signaling. In one embodiment, the network scheduled duration for GNSS measurement is a new scheduling gap or a GNSS timer. In another embodiment, the network scheduled gap duration for GNSS measurement is indicated by higher layer parameter of ue-ScheduledGapGNSS. In one embodiment, the GNSS assistance information further comprising a GNSS validity duration or remaining GNSS validity duration. In one embodiment, the UE triggers a scheduling request at the end of the network scheduled duration for GNSS measurement, and wherein the scheduling request is to report including one or more GNSS assistance information elements comprising at least one of a new GNSS position fix time duration for measurement, and a new GNSS validity duration or a new remaining GNSS validity duration.

In one novel aspect, the network entity, such as a base station, receives GNSS assistance information from the UE, wherein the GNSS assistance information includes a GNSS position fix time duration for measurement, determines one or more network scheduled durations for GNSS measurement for the UE based on the received GNSS assistance information, wherein the network scheduled GNSS duration is configured to enable the UE to re-acquire a GNSS position fix in a UE RRC_CONNECTED state, and transmits the network scheduled one or more durations for GNSS measurement to the UE. In one embodiment, the network scheduled durations for GNSS measurement are configured for the UE to further re-acquire downlink (DL) synchronization and optionally, NTN system information block (SIB). In another embodiment, the network scheduled durations for GNSS measurement are cell-specific transmitted to the UE in an RRC signal or carried in an SIB, or UE-specific transmitted to the UE in an RRC signaling. In one embodiment, the network scheduled duration for GNSS measurement is a new scheduling gap or a GNSS timer. In another embodiment, the base station receives a scheduling request at the end of the network scheduled GNSS duration, and wherein the scheduling request requests uplink resources for one or more assistance information elements comprising a new GNSS position fix time duration for measurement, and a new GNSS validity duration or a new remaining GNSS validity duration. In one embodiment, no UE downlink (DL) assignment nor UE uplink (UL) grant is scheduled while the GNSS timer or GNSS gap is running.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
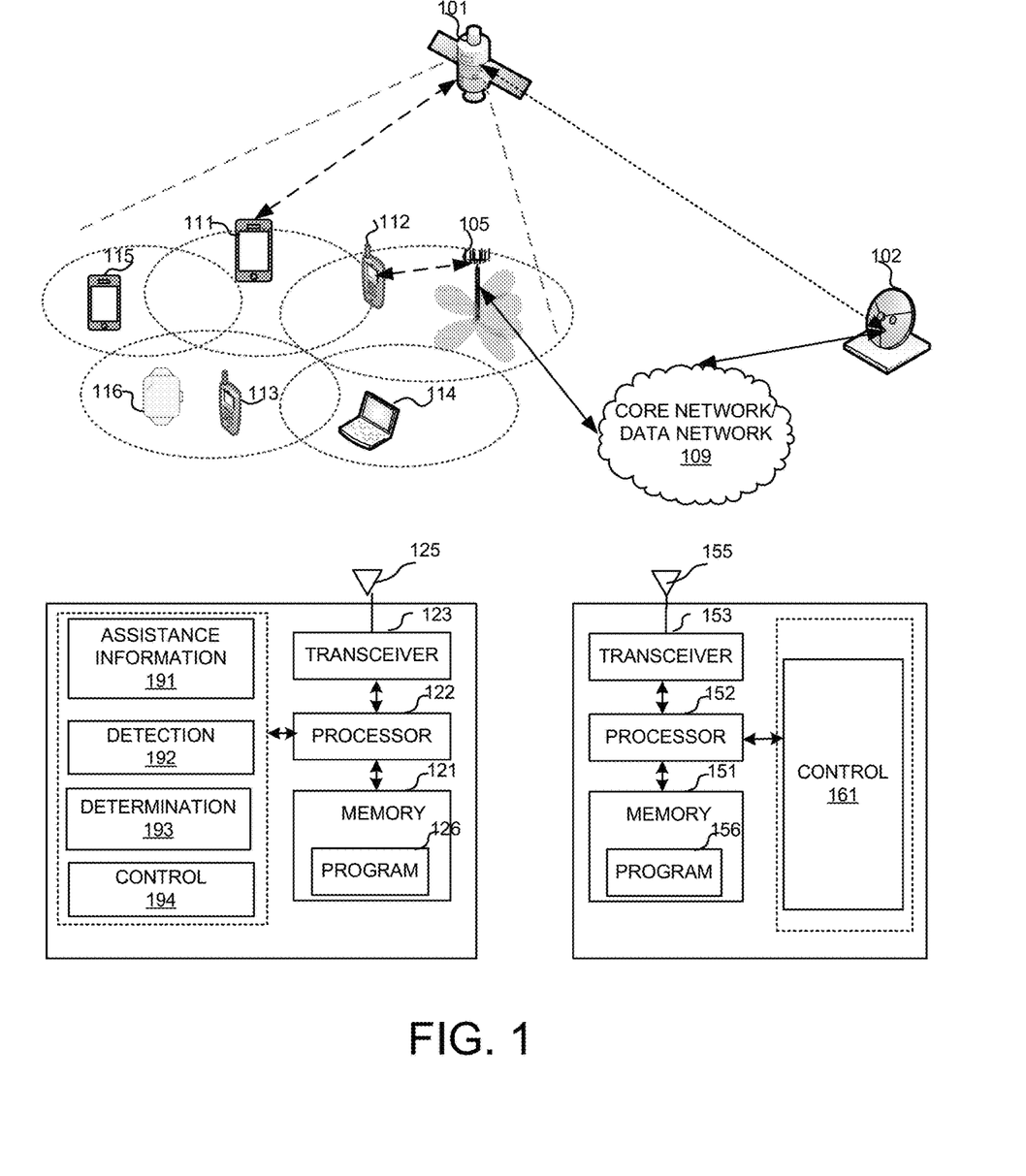
FIG. 1 illustrates a schematic system diagram illustrating an exemplary NTN system that the UE reacquires GNSS position fix in the RRC_CONNECTED state in accordance with embodiments of the current invention.

FIG. 1 illustrates a schematic system diagram illustrating an exemplary NTN system that the UE reacquires GNSS position fix in the RRC_CONNECTED state in accordance with embodiments of the current invention. NTN refers to a network that uses radio frequency and information processing resources carried on high, medium and low orbit satellites, such as satellite 101, or other high-altitude communication platforms to provide communication services for UEs. According to the load capacity on the satellite, there are two typical scenarios: transparent payload and regenerative payload. The transparent payload mode means that the satellite will not process the signal and waveform in the communication service, but only forward the data as an RF amplifier. Regenerative payload mode refers to the satellite, besides RF amplification, also has the processing capabilities of modulation/demodulation, coding/decoding, switching, routing and so on. The NTN system includes multiple communication devices or mobile stations, such as mobile phones, tablets, laptops, and other devices whether movable, mobile, or stationary, as exemplary illustrated UEs 111, 112, 113, 114, 115, and 116. The UE in the NTN can establish a communication link with one or more network devices, i.e., NTN nodes, or base stations. For example, various NTN nodes 101, NTN gateway 102, and a base station 105. The network node can be a communication node, such as radio access network (RAN) such as a 5G base station (gNB), an evolved universal mobile telecommunications system (UMTS), a terrestrial radio access (E-UTRA), an enhanced 4G eNodeB E-UTRA base station (eNB), e.g., an enhanced Node B, an enhanced gNB (en-gNB), or a next generation eNB (ng-eNB). The NTN node can be implemented using various non-terrestrial systems. Core network/data network 109 can be a homogeneous network or heterogeneous network, which can be deployed with the same frequency or different frequencies.

At present, the UE needs to have a valid GNSS fix before going to connected. When the GNSS fix becomes outdated in RRC_CONNECTED mode, the UE goes to IDLE mode. For GNSS position fix, hot start requires about 1~2 seconds, warm start requires several seconds, and cold start requires about thirty seconds. The solution is not feasible for UE with potential long uplink transmission and additional re-access to network is needed, which is costing in terms of signaling overhead and delay. Depending on UE mobility, UE in RRC-connected state will need a new GNSS position fix in order to accommodate the accumulated time and frequency errors to reduce the possible radio link failure.

In one novel aspect, UE reacquires a valid GNSS position fix in long connection time without going to IDLE. In one embodiment, the UE in the RRC_CONNECTED state determines whether a current UE GNSS position fix time duration for measurement is smaller than a network scheduled GNSS duration. The UE performs a GNSS position acquisition procedure in the RRC_CONNECTED state when the current UE GNSS position fix time duration for measurement is smaller than the network scheduled GNSS duration. The UE determines its GNSS validity duration X and reports information associated with this valid duration to the network via RRC signaling. As an example, the GNSS validity duration X is one selected from X={10 s, 20 s, 40 s, 50 s, 60 s, 5 min, 10 min, 15 min, 20 min, 25 min, 60 min, 90 min, 120 min, infinity}. When the transmission is not longer than the validity timer for UL synchronization, the transmission is a short transmission. When the transmission takes longer than the configured validity duration X, the UE performs GNSS position acquisition procedure in the RRC_CONNECTED state when one or more predefined conditions are met.

Further, UE in RRC-connected state will need a new GNSS position fix in order to accommodate the accumulated time and frequency errors to reduce the possible radio link failure. UEs especially with high speed may need frequent GNSS position fix during long-term connections, which will introduce large power consumption. Besides, for long connection time, if UE always re-acquire GNSS position fix in idle, additional re-access to network is needed, which is costing in terms of signaling overhead and delay.

FIG. 1 further illustrates simplified block diagrams of a mobile device/UE to perform embodiments of the current invention. The UE has an antenna 125, which transmits and receives radio signals. An RF transceiver circuit 123, coupled with the antenna, receives RF signals from antenna 125, converts them to baseband signals, and sends them to processor 122. In one embodiment, the RF transceiver may comprise two RF modules (not shown). RF transceiver 123 also converts received baseband signals from processor 122, converts them to RF signals, and sends out to antenna 125. Processor 122 processes the received baseband signals and invokes different functional modules to perform features in the UE. Memory (or storage medium, or computer-readable medium) 121 stores program instructions and data 126 to control the operations of the UE. Antenna 125 sends uplink transmission and receives downlink transmissions to/from base stations.

The UE also includes a set of control modules that carry out functional tasks. These control modules can be implemented by circuits, software, firmware, or a combination of them. An assistance information module 191 reports global navigation satellite system (GNSS) assistance information to a network entity in the wireless system, wherein the GNSS assistance information includes a reported UE GNSS position fix time duration for measurement. A detection module 192 that detects one or more GNSS measurement triggering conditions in an RRC_CONNECTED state. A determination module 193 determines whether a current UE GNSS position fix time duration for measurement is smaller than a network scheduled GNSS duration for GNSS measurement, wherein the network scheduled GNSS duration is configured for the UE to re-acquire GNSS position fix in the RRC_CONNECTED state and is based on the reported UE GNSS position fix time duration for measurement. A GNSS control module 194 performs a GNSS position acquisition procedure in the RRC_CONNECTED state when the current UE GNSS position fix time duration for measurement is smaller than the network scheduled GNSS duration, otherwise, leaving the RRC_CONNECTED and performing the GNSS position fix acquisition procedure in RRC_IDLE.

FIG. 1 further illustrates simplified block diagrams of a base station to perform embodiments of the current invention. The base station has an antenna 155, which transmits and receives radio signals. An RF transceiver circuit 153, coupled with the antenna, receives RF signals from antenna 155, converts them to baseband signals, and sends them to processor 152. In one embodiment, the RF transceiver may comprise two RF modules (not shown). RF transceiver 153 also converts received baseband signals from processor 152, converts them to RF signals, and sends out to antenna 155. Processor 152 processes the received baseband signals and invokes different functional modules to perform features in the UE. Memory (or storage medium, or computer-readable medium) 151 stores program instructions and data 156 to control the operations of the base station. Antenna 155 sends downlink transmissions and receives uplink transmission to/from the UEs. One or more control modules 161 coupled with the processor 152 and performs tasks and communicates with the UEs. In one embodiment, the control module is configured to receives GNSS assistance information from a user equipment (UE) in a wireless network, wherein the GNSS assistance information includes a reported UE GNSS position fix time duration for measurement, determines a network scheduled GNSS duration for the UE based on the received GNSS assistance information, wherein the network scheduled GNSS duration is configured to enable the UE to re-acquire a GNSS position fix in a UE RRC_CONNECTED state, and transmits the network scheduled GNSS duration to the UE.

Figure 2:
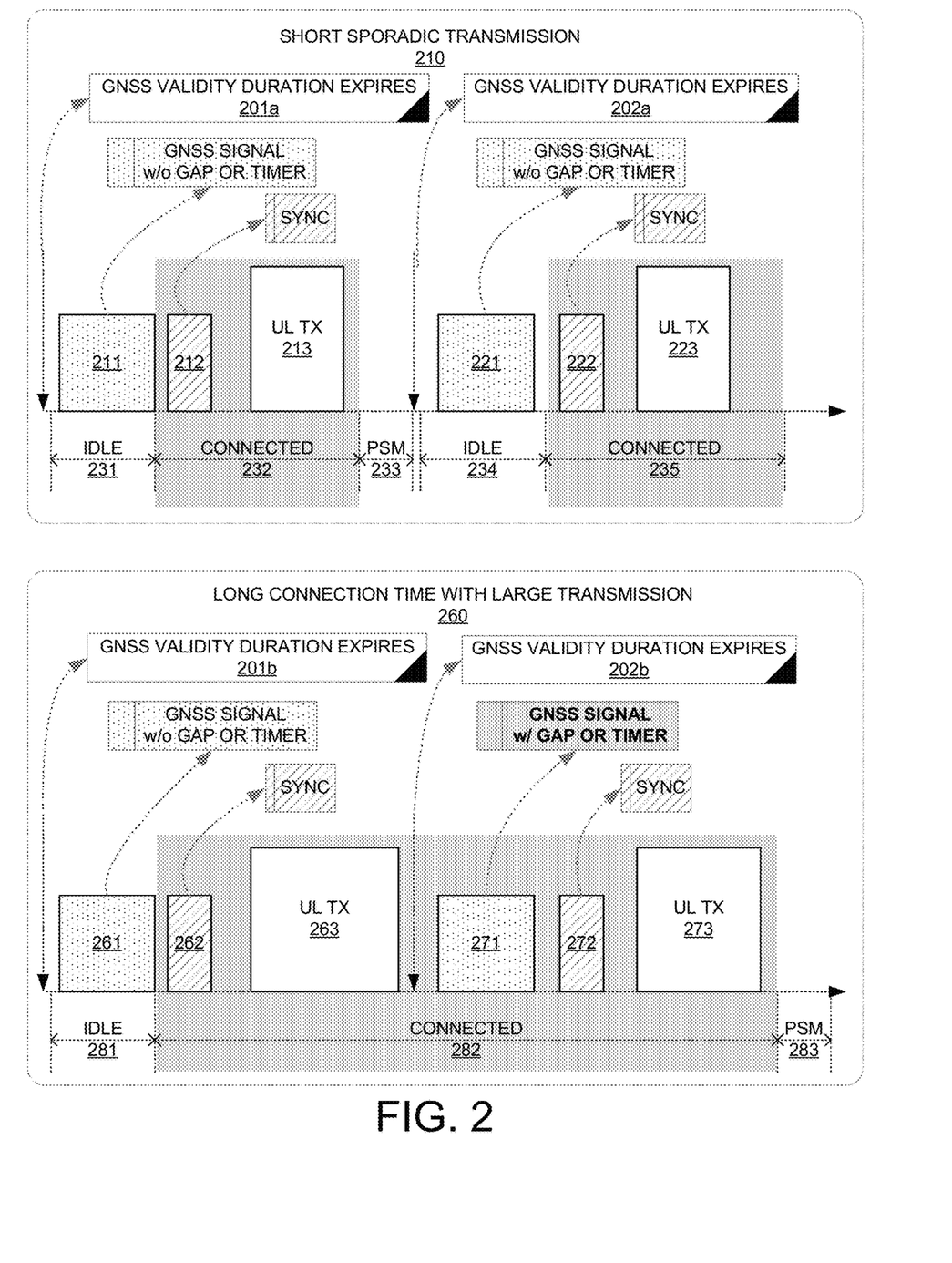
FIG. 2 illustrates exemplary diagrams for UE acquiring GNSS signal with short transmission and long transmission in accordance with embodiments of the current invention.

FIG. 2 illustrates exemplary diagrams for UE acquiring GNSS signal with short transmission and long transmission in accordance with embodiments of the current invention. In the NTN system, the UE needs to have GNSS position fix. In one scenario 210 with short sporadic transmission, the UE can go to IDLE state and reacquire the GNSS position fix. At 201*a*, the UE detects the GNSS validity duration expires. At 211, the UE acquires GNSS position fix during RRC_IDLE 231, without a GNSS gap or timer configuration. UE enters RRC_CONNECTED 232 and performs sync procedures at 212. In RRC_CONNECTED 232, the UE performs UL transmission 213. At the end of the short sporadic transmission 213, the UE enters power saving mode (PSM) 233. The UE autonomously determines its GNSS validity duration X and reports it to the network in Msg5. As an example, the validity duration X is one selected from X={10 s, 20 s, 30 s, 40 s, 50 s, 60 s, 5 min, 10 min, 15 min, 20 min, 25 min, 30 min, 60 min, 90 min, 120 min, infinity}. The duration of the short transmission, such as UL TX 213 is shorter than the configured validity duration X. At 202*a*, the UE detects that the GNSS validity duration expires. UE enters IDLE 234 upon the GNSS validity duration expiration. At step 221, in the UE RRC_IDLE state, the UE reacquires GNSS position fix without gap or timer configuration. Upon success of acquiring GNSS position fix, the UE enters RRC_CONNECTED state 235. At 222, in the RRC_CONNECTED state, the UE performs the synchronization procedure (222). At 223, the UE performs UL transmission 223. In this scenario, When the GNSS position fix becomes outdated in the RRC_CONNECTED state, the UE goes to IDLE mode, which requires processing time. It is not efficient for longer transmission and/or UE are moving around and needs to acquire the GNSS position fix more frequently in the RRC_CONNECTED state.

In scenario 260, the UE stays in the RRC_CONNECTED with long connection time and reacquires GNSS position fix in the RRC_CONNECTED state. At 201*b*, the UE detects the GNSS validity duration expires. At 261, the UE acquires GNSS position fix during RRC_IDLE 281, without a GNSS gap or timer configuration. The UE autonomously determines its GNSS validity duration X and reports it to the network in Msg5. UE enters RRC_CONNECTED 282 and performs sync procedures at 262. In RRC_CONNECTED 282, the UE performs UL transmission 263. At 202*b*, the UE detects that the GNSS validity duration expires. In one novel aspect, the UE stays in the RRC_CONNECTED. The UE determines if the network scheduled GNSS duration is greater than the current GNSS position fix time length at the time of the validity duration expired. If the network scheduled GNSS duration is large enough for the GNSS position fix, the UE, at 271, reacquires GNSS position fix in RRC_CONNECTED state 282 based on the network scheduled duration, either a measurement gap or a timer. At step 272, upon success of acquiring GNSS position fix in the RRC_CONNECTED state, the UE performs the synchronization procedure (272). At 273, the UE performs UL transmission 273. Upon the completion of the data transceiving, the UE enters PSM 283.

Figure 3:
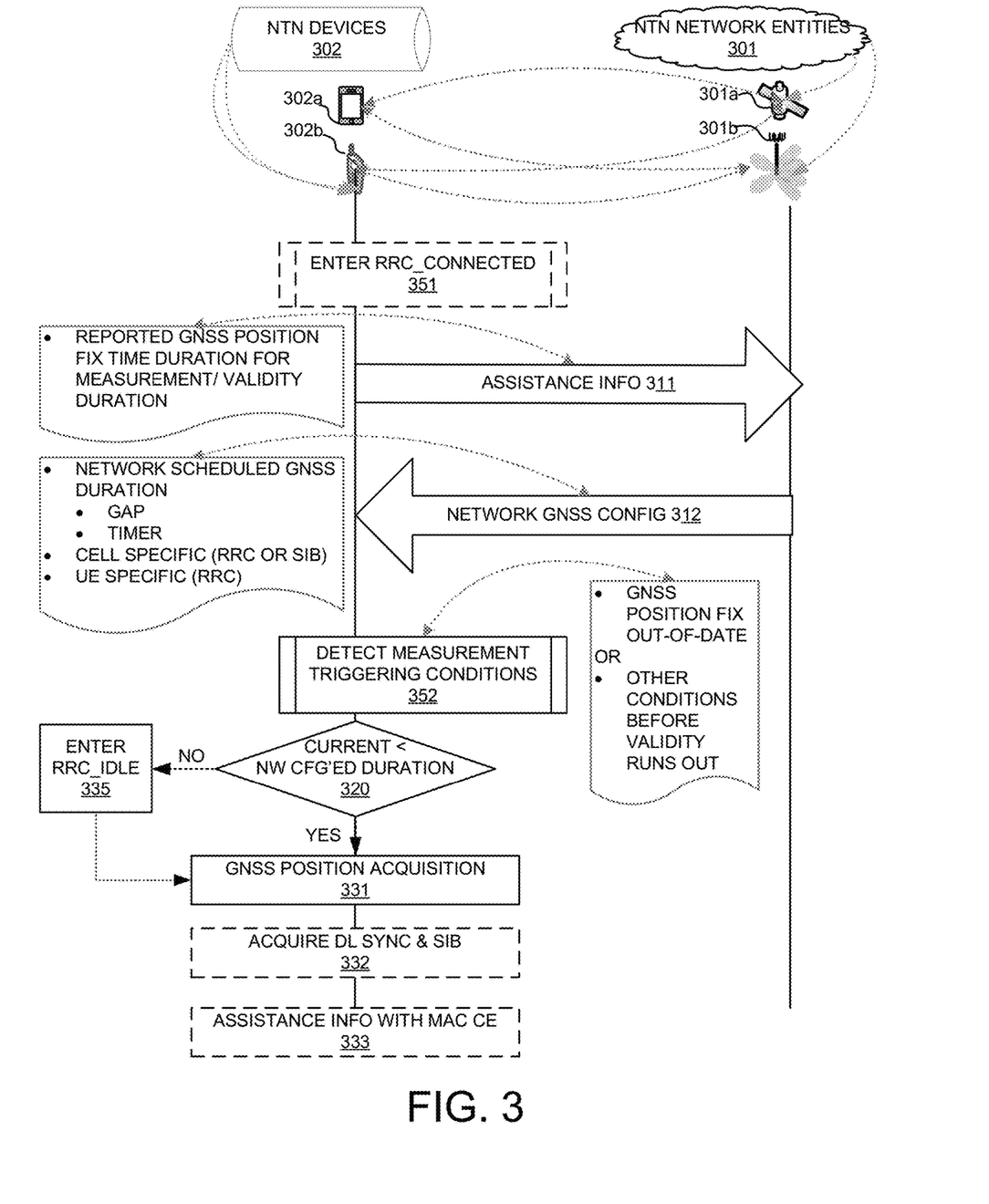
FIG. 3 illustrates exemplary diagrams for acquiring GNSS position fix in RRC_CONNECTED state in accordance with embodiments of the current invention.

FIG. 3 illustrates exemplary diagrams for acquiring GNSS position fix in RRC_CONNECTED state in accordance with embodiments of the current invention. In the NTN system, NTN network entities 301 communicate with NTN devices 302. NTN system provides multiple services and can include new radio (NR) NTN, Internet of Things (IoT) NTN and other services. The NTN device may be a NR NTN device 302*a* and/or an IoT NTN device 302*b*. NTN devices may directly communicate with NTN network entities through a satellite 301*a* and/or gNB 301*b*. At step 351, the UE/NTN device enters RRC_CONNECTED state. At step 311, the UE sends assistance information to the network. The UE sends assistance information upon entering the RRC_CONNECTED state. In one embodiment, the assistance information includes the GNSS position fix time duration for measurement. In another embodiment, the GNSS assistance information further includes the GNSS validity duration or the remaining GNSS validity duration. In one embodiment, the GNSS position fix time duration for measurement may be reported via Msg5. At step 312, the network sends GNSS configuration, including network scheduled GNSS duration to the UE. In one embodiment, the network scheduled duration is a measurement gap duration. In another embodiment, the network scheduled duration is a value for a timer, such as the T31Y timer value. The network scheduled GNSS duration is sent to the UE in cell specific messages, such as a SIB or RRC. In another embodiment, network scheduled GNSS duration is sent to the UE in UE specific messages, such as an RRC message. At step 352, the UE detects one or more measurement triggering conditions. In one embodiment, the measurement triggering condition includes the GNSS position out-of-date condition. The measurement triggering conditions further includes other conditions before the GNSS position out-of-date, which is before the GNSS validity runs out. In one embodiment, the GNSS position is out-of-date when the GNSS validity timer expired. The UE, at step 320, determines whether the current GNSS position fix time duration for measurement is smaller than the network scheduled duration. In one embodiment, the current GNSS position fix time duration for measurement includes at least the duration for UE to make GNSS measurement. In another embodiment, the current GNSS position fix time duration for measurement further includes time duration to re-acquire DL synchronization and re-acquire NTN SIB, if needed. If step 320 determines no, at step 335, the UE performs the actions upon leaving RRC_CONNECTED or enters RRC_IDLE state. The UE subsequently reacquires the GNSS position fix in the RRC_IDLE state. If step 320 determines yes, the UE reacquires GNSS position fix at step 331. In one embodiment, at step 332, the UE further acquires DL sync and NTN SIB. At step 333, the UE sends assistance information to the network. In one embodiment, the assistance information is sent with MAC control element (CE).

Figure 4:
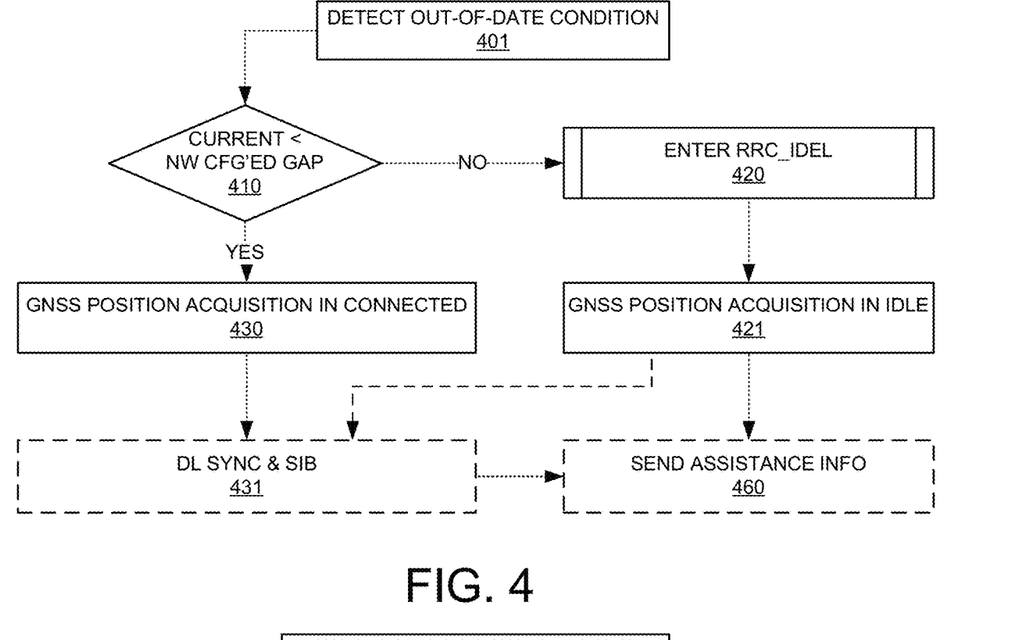
FIG. 4 illustrates an exemplary flow diagram for the UE to reacquire GNSS position fix based on network scheduled GNSS measurement gap in accordance with embodiments of the current invention.

FIG. 4 illustrates an exemplary flow diagram for the UE to reacquire GNSS position fix based on network scheduled GNSS measurement gap in accordance with embodiments of the current invention. In one embodiment, the network configures a GNSS measurement gap for the UE to reacquire the GNSS position fix in the RRC_CONNECTED state. The network configured GNSS measurement gap is based on the UE assistance information, which includes a GNSS position fix time duration for measurement. In one embodiment, the GNSS measurement gap is sent to the UE with ue-ScheduledGapGNSS. At step 401, the UE detects the GNSS position out-of-date condition. In one embodiment, the GNSS position out-of-date condition includes the expiration of the GNSS validity timer. At step 410, the UE determines whether the current GNSS position fix time duration for measurement is smaller than the network scheduled GNSS gap. In one embodiment, the network scheduled gap, which is indicated in ue-ScheduledGapGNSS, includes duration for the UE to at least reacquire GNSS position fix in the RRC_CONNECTED state. In another embodiment, the network scheduled GNSS gap further includes time to reacquire DL synchronization and re-acquire the NTN SIB if needed in the RRC_CONNECTED state. If step 410 determines no, the UE enters RRC_IDLE state (420). At step 421, the UE in the RRC_IDLE state acquires GNSS position fix. In embodiment, the UE moves to the RRC_CONNECTED when the UE successfully acquires GNSS position fix, acquires DL synchronization and NTN SIB if needed. If step 410 determines yes, the UE, at step 430, reacquires GNSS position fix in the RRC_CONNECTED state. At step 431, the UE acquires DL synchronization and NTN SIB if needed. At step 460, the UE sends new assistance information to the network. The new assistance information includes at least one of the GNSS position fix time duration for measurement and the new GNSS validity duration and remaining GNSS validity duration.

Figure 5:
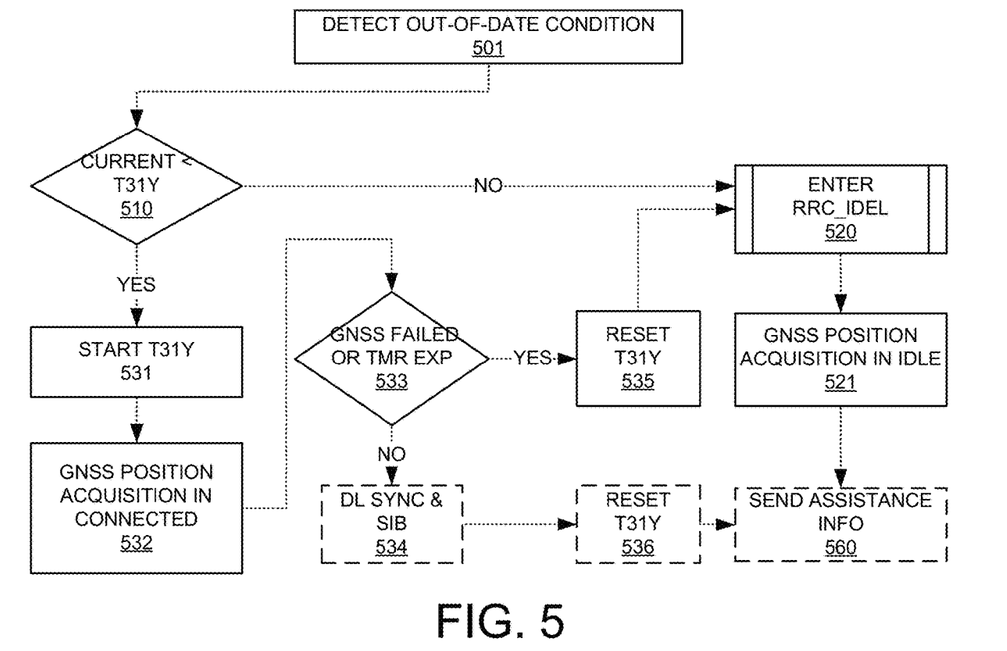
FIG. 5 illustrates an exemplary flow diagram for the UE to reacquire GNSS position fix based on network scheduled timer in accordance with embodiments of the current invention.

FIG. 5 illustrates an exemplary flow diagram for the UE to reacquire GNSS position fix based on network scheduled timer in accordance with embodiments of the current invention. In one embodiment, the network configures a timer, such as the T31Y, for the UE to reacquire the GNSS position fix in the RRC_CONNECTED state. The network configured T31Y is based on the UE assistance information, which includes a GNSS position fix time duration for measurement. In one embodiment, the timer length is sent to the UE with higher layer signaling, e.g. ue-ScheduledGapGNSS. The higher layer signaling used to indicate the timer length may be the same with the signaling used to indicate the gap length, or may be different from the signaling used to indicate the gap length. At step 501, the UE detects the GNSS position out-of-date condition. In one embodiment, the GNSS position out-of-date condition includes the expiration of the GNSS validity timer. At step 510, the UE determines whether the current GNSS position fix time duration for measurement is smaller than the network scheduled GNSS duration of T31Y. In one embodiment, the network scheduled gap, which is indicated in ue-ScheduledGapGNSS, includes duration for the UE to at least reacquire GNSS position fix in the RRC_CONNECTED state. In another embodiment, the network scheduled GNSS gap further includes time to reacquire DL synchronization and re-acquire the NTN SIB if needed in the RRC_CONNECTED state. If step 510 determines no, the UE enters RRC_IDLE state (520). At step 521, the UE in the RRC_IDLE state acquires GNSS position fix. In embodiment, the UE moves to the RRC_CONNECTED when the UE successfully acquires GNSS position fix, acquires DL synchronization and NTN SIB if needed. If step 510 determines yes, the UE, at step 531, starts T31Y Timer. At step 532, the UE reacquires GNSS position fix in the RRC_CONNECTED state. Upon successful acquires the GNSS position fix, at step 533, the UE determines if the T31Y expires. If step 533 determines yes, or if the acquiring of GNSS position fix is failed, at step 535, the UE reset the T31Y timer and moves to RRC_IDLE state (520). If 533 determines no, at step 534, the UE acquires DL synchronization and NTN SIB if needed. At step 536, the UE reset T31Y timer. At step 560, the UE sends new assistance information to the network. The new assistance information includes at least one of the GNSS position fix time duration for measurement and the new GNSS validity duration and remaining GNSS validity duration.

Figure 6:
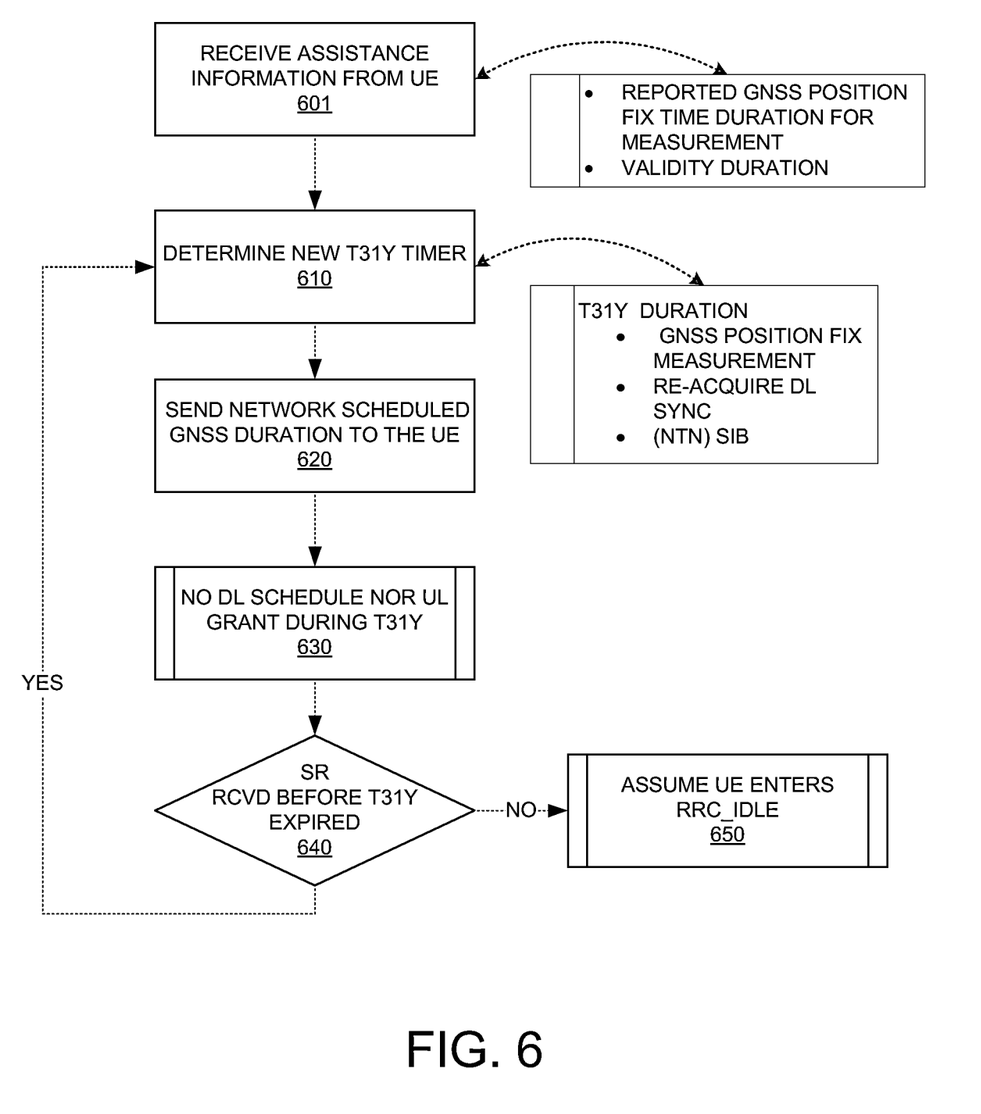
FIG. 6 illustrates an exemplary flow diagram for the base station to configure the UE for re-acquiring GNSS position fix in the RRC_CONNECTED state in accordance with embodiments of the current invention.

FIG. 6 illustrates an exemplary flow diagram for the base station to configure the UE for reacquiring GNSS position fix in the RRC_CONNECTED state in accordance with embodiments of the current invention. In one novel aspect, the base station receives assistance information from a UE, which includes a reported UE GNSS position fix time duration for measurement, determines a network scheduled GNSS duration for the UE based on the received GNSS assistance information, wherein the network scheduled GNSS duration is configured to enable the UE to re-acquire a GNSS position fix in a UE RRC_CONNECTED state, and transmits the network scheduled GNSS duration to the UE. At step 601, the base station receives assistance information from the UE. The assistance information included a reported UE GNSS position fix time duration for measurement, which is duration for the UE to acquire the GNSS measurement position fix. The assistance information may further includes the GNSS validity duration or remaining GNSS validity duration. At step 610, the base station determines a new network scheduled GNSS duration for the UE. In one embodiment, the network scheduled GNSS duration is a timer, such as the T31Y timer. In one embodiment, new scheduled T31Y is configured such that the UE, the RRC_CONNECTED stat, can at least reacquire GNSS position fix and further includes time to reacquire DL synchronization and NTN SIB if needed. In one embodiment, the value for the network scheduled GNSS duration is cell specific indicated by SIB or RRC signaling. In another embodiment, the value for the network scheduled GNSS duration is UE specific indicated by RRC signaling. At step 620, the base station sends the network scheduled GNSS duration to the UE. In one embodiment (630), the network does not schedule the UE with DL assignment or UL grant during the gap and/or the time of T31Y, which is while the UE is performing the acquisition of the GNSS position fix and optionally further including DL synchronization and NTN SIB if needed. At step 640, the base station determines if a scheduling request (SR) is received from the UE after the expiration of the T31Y. If step 640 determines yes, the base station processes the SR and updates the network scheduled GNSS duration if needed. In one embodiment, the SR is to request uplink resources to report one or more GNSS assistance information elements comprising a new GNSS position fix time duration for measurement, a new GNSS validity duration, and a new remaining GNSS validity duration If there is no SR received after the expiration of T31Y timer, the network determines that the UE has entered the RRC_IDLE state.

Figure 7:
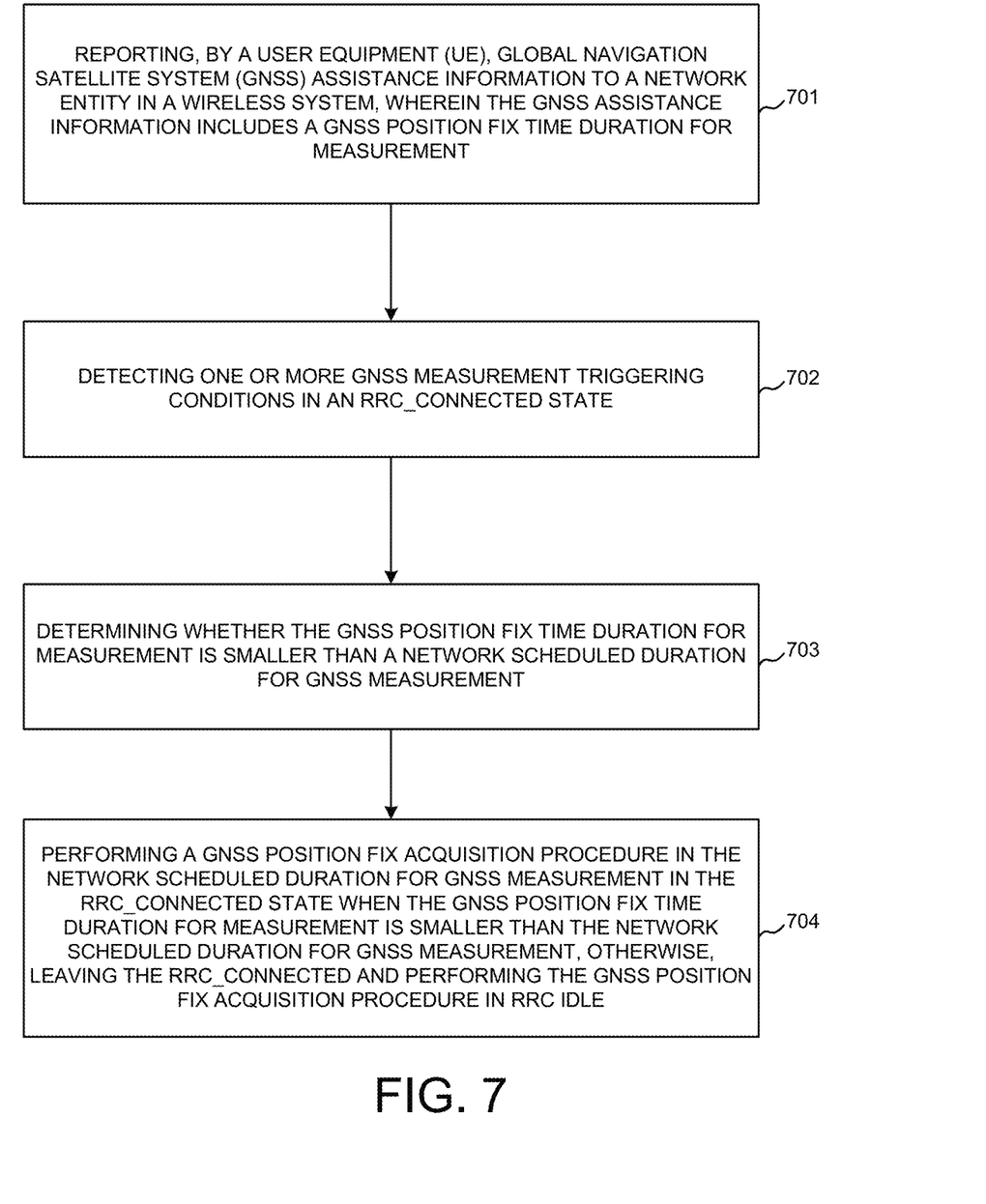
FIG. 7 illustrates an exemplary flow chart for the UE to re-acquire GNSS position fix in RRC_CONNECTED state in accordance with embodiments of the current invention.

FIG. 7 illustrates an exemplary flow chart for the UE to reacquire GNSS position fix in RRC_CONNECTED state in accordance with embodiments of the current invention. At step 701, the UE reports GNSS assistance information to a network entity in a non-terrestrial network (NTN) wireless system, wherein the GNSS assistance information includes a reported UE GNSS position fix time duration for measurement. At step 702, the UE detects a GNSS one or more GNSS measurement triggering conditions in an RRC_CONNECTED state. At step 703, the UE determines whether a current UE GNSS position fix time duration for measurement is smaller than a network scheduled GNSS duration for GNSS measurement. At step 704, the UE performs a GNSS position acquisition procedure in the RRC_CONNECTED state when the current UE GNSS position fix time duration for measurement is smaller than the network scheduled GNSS duration for GNSS measurement, otherwise, leaving the RRC_CONNECTED and performing the GNSS position fix acquisition procedure in RRC idle.

Figure 8:
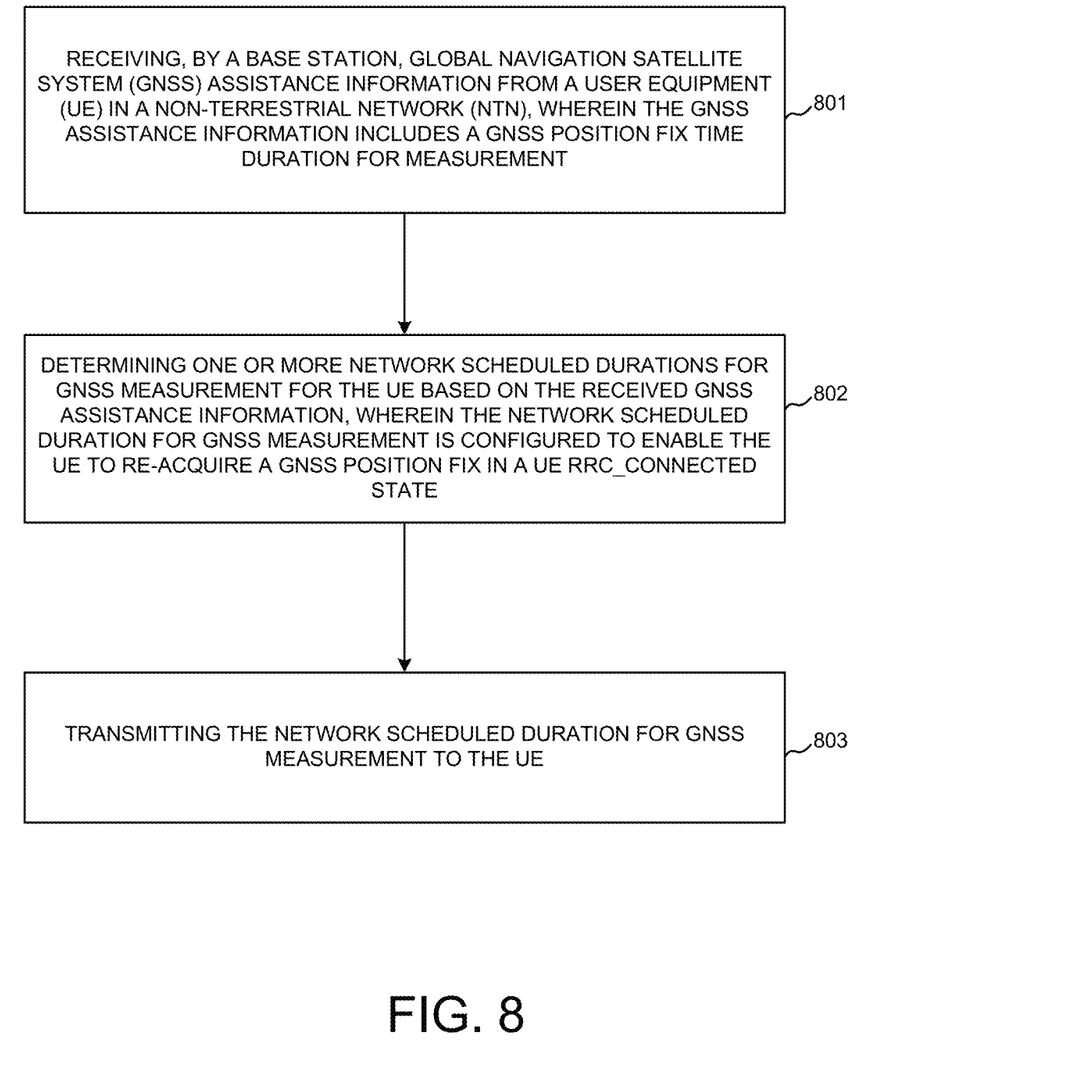
FIG. 8 illustrates an exemplary flow chart for the base station to configure the UE to reacquire GNSS position fix in the RRC_CONNECTED state in accordance with embodiments of the current invention.

FIG. 8 illustrates an exemplary flow chart for the base station to configure the UE to reacquire GNSS position fix in the RRC_CONNECTED state in accordance with embodiments of the current invention. At step 801, the base station receives a GNSS assistance information from a user equipment (UE) in a non-terrestrial network (NTN), wherein the GNSS assistance information includes a reported UE GNSS position fix time duration for measurement. At step 802, the base station determines a network scheduled GNSS duration for GNSS measurement for the UE based on the received GNSS assistance information, wherein the network scheduled GNSS duration for GNSS measurement is configured to enable the UE to re-acquire a GNSS position fix in a UE RRC_CONNECTED state. At step 803, the base station transmits the network scheduled GNSS duration for measurement to the UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
reporting, by a user equipment (UE), global navigation satellite system (GNSS) assistance information to a network entity in a wireless system,
wherein the GNSS assistance information includes a GNSS position fix time duration for measurement;
detecting one or more GNSS measurement triggering conditions in an RRC_CONNECTED state;
determining whether the GNSS position fix time duration for measurement is smaller than a network scheduled duration for GNSS measurement,
wherein the network scheduled duration for GNSS measurement is determined by one procedure selecting from being received from the network and indicated by one or more higher layer parameters, and being at least one of a scheduling gap and a GNSS timer; and
performing a GNSS position fix acquisition procedure in the network scheduled duration for GNSS measurement in the RRC_CONNECTED state when the GNSS position fix time duration for measurement is smaller not larger than the network scheduled duration for GNSS measurement, otherwise, leaving the RRC_CONNECTED and performing the GNSS position fix acquisition procedure in RRC idle.

2. The method of claim 1, wherein the GNSS measurement triggering condition is a GNSS position out-of-date condition in an RRC_CONNECTED state.

3. The method of claim 1, wherein the network scheduled duration for GNSS measurement is configured for the UE to re-acquire GNSS position fix in the RRC_CONNECTED state and is based on the GNSS position fix time duration for measurement.

4. The method of claim 3, wherein the network scheduled duration for GNSS measurement is configured for the UE to further re-acquire downlink (DL) synchronization.

5. The method of claim 4, wherein the network scheduled duration for GNSS measurement is configured for the UE to further re-acquire system information block (SIB).

6. The method of claim 3, wherein the network scheduled duration for GNSS measurement is cell-specific indicated by a SIB or a RRC signaling or UE-specific indicated by an RRC signaling.

7. The method of claim 1, wherein the scheduling gap is indicated by higher layer parameter of ue-ScheduledGapGNSS.

8. The method of claim 1, wherein the GNSS assistance information further comprising a GNSS validity duration or a remaining GNSS validity duration.

9. The method of claim 1, further comprising triggering a scheduling request at an end of the network scheduled duration for GNSS measurement, and wherein the scheduling request is to request uplink resources to report one or more GNSS assistance information elements comprising a new GNSS position fix time duration for measurement, a new GNSS validity duration, and a new remaining GNSS validity duration.

10. A method, comprising:
receiving, by a base station, global navigation satellite system (GNSS) assistance information from a user equipment (UE) in a non-terrestrial network (NTN), wherein the GNSS assistance information includes a GNSS position fix time duration for measurement;
determining one or more network scheduled durations for GNSS measurement for the UE based on the received GNSS assistance information,
wherein the network scheduled duration for GNSS measurement is configured based on or more criteria comprising to enable the UE to re-acquire a GNSS position fix in a UE RRC_CONNECTED state, and
the network scheduled duration for GNSS measurement being at least one of a scheduling gap or a GNSS timer; and
transmitting the network scheduled duration for GNSS measurement to the UE.

11. The method of claim 10, wherein the network scheduled duration for GNSS measurement is configured for the UE to further re-acquire a downlink (DL) synchronization.

12. The method of claim 11, wherein the network scheduled duration for GNSS measurement is configured for the UE to further re-acquire system information block (SIB).

13. The method of claim 10, wherein the network scheduled GNSS duration is cell-specific transmitted to the UE in a SIB or an RRC signal or is UE-specific transmitted to the UE in an RRC signal.

14. The method of claim 10, wherein no UE downlink (DL) assignment nor UE uplink (UL) grant is scheduled while the GNSS timer or the scheduling gap is running.

15. The method of claim 10, wherein the GNSS assistance information further comprising a GNSS validity duration or a remaining GNSS validity duration.

16. The method of claim 10, further comprising receiving a scheduling request from the UE at an end of the network scheduled GNSS duration, and wherein the scheduling request requests uplink resources for one or more assistance information elements comprising a new GNSS position fix time duration for measurement, a new GNSS validity duration, and a new remaining GNSS validity duration.

17. The method of claim 16, further comprising the base station determining the UE being in a UERRC_IDLE state when no scheduling request is received from the UE at the end of the network scheduled duration for GNSS measurement.

18. A user equipment (UE), comprising:
a transceiver that transmits and receives radio frequency (RF) signal in a non-terrestrial network (NTN) wireless system;
an assistance information module that reports global navigation satellite system (GNSS) assistance information to a network entity in the NTN wireless system, wherein the GNSS assistance information includes a GNSS position fix time duration for measurement;
a detection module that detects one or more GNSS position measurement triggering conditions in an RRC_ CONNECTED state;
a determination module that determines whether GNSS position fix time duration for measurement is smaller than a network scheduled duration for GNSS measurement,
wherein the network scheduled duration for GNSS measurement is determined by one procedure selecting from being received from the network and
indicated by one or more higher layer parameters, being configured for the UE to reacquire GNSS position fix in the RRC_CONNECTED state and is based on the UE reported GNSS position fix time duration for measurement and
being at least one of a scheduling gap and a GNSS timer; and
a GNSS control module that performs a GNSS position fix acquisition procedure in the RRC_CONNECTED state when the GNSS position fix time duration for measurement is smaller than the network scheduled GNSS duration for GNSS measurement, otherwise, leaving the RRC_CONNECTED and
performing the GNSS position fix acquisition procedure in RRC_IDLE.

19. The UE of claim 18, wherein the network scheduled one or more durations for GNSS measurement are received from the network and indicated by one or more higher layer parameter, and wherein the network scheduled duration for GNSS measurement is configured for the UE to re-acquire GNSS position fix in the RRC_CONNECTED state and is based on the UE reported GNSS position fix time duration for measurement.

20. The UE of claim 19, wherein the network scheduled duration for GNSS measurement is configured for the UE to further re-acquire downlink (DL) synchronization.

21. The UE of claim 20, wherein the network scheduled duration for GNSS measurement is configured for the UE to further re-acquire system information block (SIB).

22. The UE of claim 18, wherein the network scheduled GNSS duration is cell-specific indicated by an RRC signal or a SIB, or is UE-specific indicated by an RRC signal.

23. The UE of claim 18, wherein the network scheduled GNSS duration is a new scheduling gap or a GNSS timer.

* * * * *